(No Model.) 2 Sheets—Sheet 1.

H. F. SHELDON.
BICYCLE.

No. 519,557. Patented May 8, 1894.

Witnesses.
Louis W. Sowell
Edward F. Allen

Inventor:
Herbert F. Sheldon
by Crosby & Gregory
Attys.

(No Model.) 2 Sheets—Sheet 2.

H. F. SHELDON.
BICYCLE.

No. 519,557. Patented May 8, 1894.

Witnesses.
Louis N. Gowell
Edward F. Allen

Inventor:
Herbert F. Sheldon
by Crosby & Gregory Attys.

UNITED STATES PATENT OFFICE.

HERBERT F. SHELDON, OF MELROSE, MASSACHUSETTS.

BICYCLE.

SPECIFICATION forming part of Letters Patent No. 519,557, dated May 8, 1894.

Application filed May 29, 1893. Serial No. 475,877. (No model.)

*To all whom it may concern:*

Be it known that I, HERBERT F. SHELDON, of Melrose Highlands, county of Middlesex, State of Massachusetts, have invented an Improvement in Bicycles, of which the following description, in connection with the accompanying drawings, is a specification, like letters and figures on the drawings representing like parts.

This invention has for its object the production of a bicycle provided with novel driving mechanism, whereby obstacles are more readily surmounted, and the power can be at times increased by the application of the full weight of the rider, without, however, necessitating his removal from the seat.

In accordance therewith my invention consists in a bicycle, of a vertically movable seat supporting standard, bearings therefor, and a rotatable shaft movable with said standard, combined with a driving wheel, a support therefor, and transmitting mechanism movable with said standard, and a gear of said mechanism in direct engagement with the rim of said driving wheel, substantially as will be described. Also, in a bicycle, a driving wheel, an annular gear thereon independent of the shaft, and a vertically movable seat supporting standard, combined with power transmitting mechanism movable with said standard, and a gear of said mechanism in direct engagement with and to rotate the said annular gear, substantially as will be described.

Other features of my invention will be hereinafter described and particularly pointed out in the claims.

Figure 1:
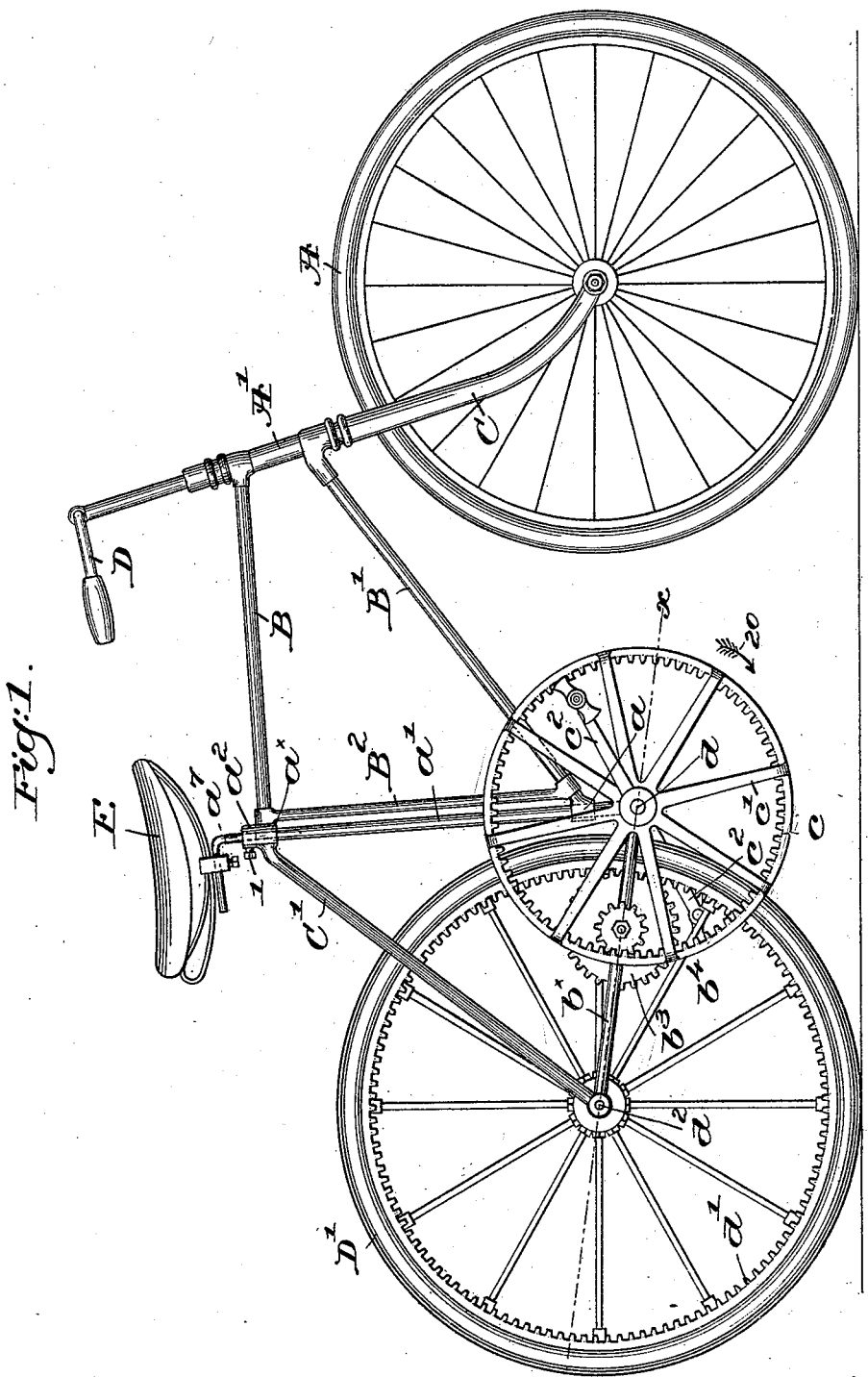
Figure 2:
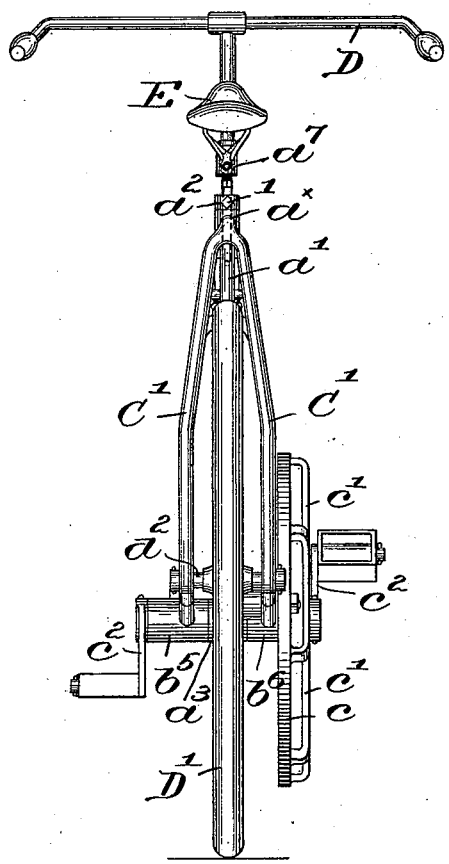
Figure 3:
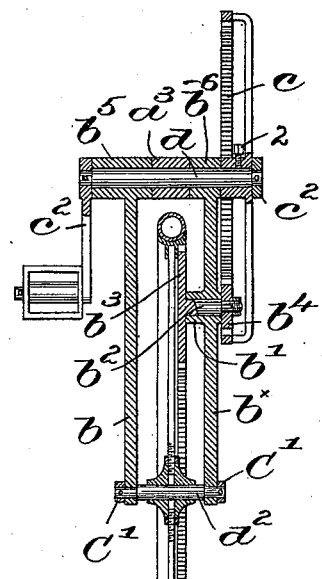
Figure 4:
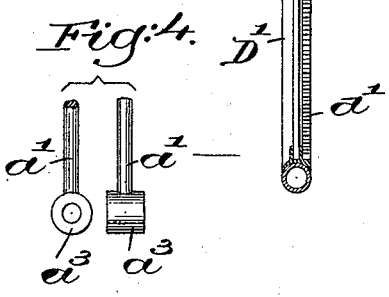

Figure 1, in side elevation, represents a bicycle of the "safety" type, with my invention applied thereto. Fig. 2 is a rear end view thereof. Fig. 3 is a section taken on the line $x$—$x$ Fig. 1; and Fig. 4 is a detail to be described.

I have herein shown my invention applied to a "safety" bicycle, in which the front wheel A, head A', back-bone B, brace B', front and rear forks C and C' respectively, handle bar D, and seat E, are and may be of any usual or well known construction. I have rigidly connected the rear ends of the back bone B and brace B' by an upright $B^2$, preferably adjacent to bearings $a^x$ and $a$, formed in the ends of the back bone and brace respectively, to receive therein a standard $a'$ having a slight longitudinal movement, the downward movement thereof being limited by a flange or collar $a^2$ at its upper end and normally resting on the bearing $a^x$. The lower end of the standard has secured thereto a bearing $a^3$, see Figs. 3 and 4, through which is extended a crank shaft $d$, to which are secured crank arms $c^2$ for the usual pedals. The crank shaft, as best shown in Fig. 3 extends beyond the bearing $a^3$ at each side and passes through sleeve-like bearings $b^5$, $b^6$, secured to or forming part of side bars $b$ and $b^x$ respectively, the rear ends of said bars loosely embracing the axle $d^2$ of the rear wheel D', as herein shown, said axle also passing through and having bearings in the ends of the rear fork C', see Figs. 1, 2 and 3, whereby longitudinal movement of the standard $a'$ turns the side bars about said axle $d^2$ as a center. Preferably the rim of the rear wheel D' is provided with an annular gear $d'$, in engagement with a gear $b^3$ fast on a short shaft $b^2$ supported in a bearing on the side bar $b^x$, see Fig. 3, the outer end of said shaft having thereon a pinion $b^4$ engaging a large internal gear $c$, the hub of which is secured by a suitable set screw as 2 to the crank shaft $d$, intermediate the bearing $b^6$ and the crank arm. For the sake of lightness, this internal gear is shown as having spokes $c'$, inturned at their extremities to permit the entrance of the pinion $b^4$, though any other suitable construction may be used. When the crank shaft is rotated by the rider in the direction of the arrow 20, Fig. 1, the rear wheel D' will be rotated in the same direction by or through the pinion $b^4$, and gear $b^3$, the speed of the said rear or driving wheel being proportional to that of the crank shaft according to the ratios of the various gears. When an obstacle is encountered by the driving wheel D' it tends to stop its rotation, the power applied as described to the gear $b^3$ at the same time tending to make it travel up along the gear $d'$, raising the side bars and crank shaft, and hence the standard $a'$. This tendency is resisted and counteracted by the weight of the rider, supported entirely by said standard, so that the gear $b^3$ is kept from rising and the full power of the rider is applied to the driving wheel, to surmount the obstacle. An easier seat is thus obtained, with a much greater application of power than is possible in other machines known to me.

The seat may be raised or lowered by means of the bent rod $a^7$, one leg of which enters the recessed upper end of the standard $a'$, as shown in dotted lines Fig. 1, and is held in adjusted position by a set screw 1.

This invention is not restricted to the precise construction and arrangement shown, as it is obvious that the same may be varied without departing from the spirit of my invention.

I claim—

1. In a bicycle, a vertically movable seat supporting standard, bearings therefor, and a rotatable shaft movable with said standard, combined with a driving wheel, a support therefor, and transmitting mechanism movable with said standard, and a gear of said mechanism in direct engagement with the rim of said driving wheel, substantially as described.

2. In a bicycle, a driving wheel, an annular gear thereon independent of the shaft, and a vertically movable seat supporting standard, combined with power transmitting mechanism movable with said standard, and a gear of said mechanism in direct engagement with and to rotate the said annular gear, substantially as described.

3. In a bicycle, a driving wheel, a gear thereon, and a vertically movable seat supporting standard, combined with a crank shaft movable with said standard, an internal gear rotatable therewith, and gearing intermediate it and the gear on the driving wheel and movable with the standard, substantially as described.

4. In a bicycle, a driving wheel, and its fixed support, a vertically movable seat standard, a crank shaft supported thereby, and a gear rotatable with said shaft, combined with pivotal connections between said shaft and driving wheel, and mechanism carried by said connections intermediate the rim of the driving wheel, and gear on the crank shaft, said mechanism including a gear directly engaging the rim of the wheel, and the crank shaft gear, substantially as described.

5. In a bicycle, the combination with the wheel rim, and its inwardly projecting teeth, of a vertically movable seat standard, side bars pivoted to said standard and to the wheel axle, a crank shaft, a gear fast thereon, and gearing intermediate the crank shaft gear and the rim teeth, said crank shaft and gearing being movable with the standard to operate substantially as described.

In testimony whereof I have signed my name to this specification in the presence of two subscribing witnesses.

HERBERT F. SHELDON.

Witnesses:
JOHN C. EDWARDS,
FREDERICK L. EMERY.